US010060535B2

(12) United States Patent
Simpson et al.

(10) Patent No.: US 10,060,535 B2
(45) Date of Patent: Aug. 28, 2018

(54) SHAPED SPRING ELEMENT FOR A NON-CONTACT SEAL DEVICE

(71) Applicant: United Technologies Corporation, Hartford, CT (US)

(72) Inventors: Alex J. Simpson, Tolland, CT (US); Christopher J. Peters, West Hartford, CT (US); Zachary D. Ryan, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 377 days.

(21) Appl. No.: 15/053,696

(22) Filed: Feb. 25, 2016

(65) Prior Publication Data
US 2017/0248236 A1    Aug. 31, 2017

(51) Int. Cl.
| F16J 15/44 | (2006.01) |
| F01D 11/02 | (2006.01) |
| F01D 11/08 | (2006.01) |
| F02C 7/28 | (2006.01) |
| F16J 15/447 | (2006.01) |

(52) U.S. Cl.
CPC ............ *F16J 15/447* (2013.01); *F01D 11/02* (2013.01); *F01D 11/025* (2013.01); *F01D 11/08* (2013.01); *F16J 15/442* (2013.01); *F02C 7/28* (2013.01); *F05D 2240/55* (2013.01); *F05D 2240/56* (2013.01)

(58) Field of Classification Search
CPC ...... F16J 15/3288; F16J 15/442; F16J 15/447; F01D 11/02; F01D 11/025; F01D 11/08; F05D 2240/55; F05D 2240/56; F02C 7/28
See application file for complete search history.

(56) References Cited

U.S. PATENT DOCUMENTS

| 6,428,009 B2 | 8/2002 | Justak |
| 7,182,345 B2 | 2/2007 | Justak |
| 7,410,173 B2 | 8/2008 | Justak |
| 7,896,352 B2 | 3/2011 | Justak |
| 8,002,285 B2 | 8/2011 | Justak |
| 8,172,232 B2 | 5/2012 | Justak |
| 8,641,045 B2 | 2/2014 | Justak |

(Continued)

FOREIGN PATENT DOCUMENTS

| CA | 2403664 | 7/2007 |
| CA | 2536362 | 2/2013 |

(Continued)

*Primary Examiner* — Nicholas L Foster
(74) *Attorney, Agent, or Firm* — O'Shea Getz P.C.

(57) ABSTRACT

A non-contact seal assembly includes a plurality of seal shoes, a seal base and a plurality of spring elements. A first of the spring elements includes a first mount, a second mount and a spring beam. The spring beam extends a length longitudinally along a centerline from the first mount to the second mount. The spring beam includes opposing first and second surfaces. The first surface is disposed a first distance from the centerline, and the second surface is disposed a second distance from the centerline. The first distance and the second distance change as the spring beam extends longitudinally along the centerline to provide at least a portion of the spring beam with a tapered geometry. The portion of the spring beam has a longitudinal length that is at least about five percent of the length of the spring beam.

20 Claims, 9 Drawing Sheets

(56) References Cited

U.S. PATENT DOCUMENTS

| | | | | |
|---|---|---|---|---|
| 8,740,225 | B2* | 6/2014 | Patterson | F01D 11/02 |
| | | | | 277/413 |
| 8,919,781 | B2 | 12/2014 | Justak | |
| 2015/0285152 | A1* | 10/2015 | Hayford | F02C 7/28 |
| | | | | 415/171.1 |
| 2015/0322816 | A1* | 11/2015 | Schmitz | F01D 1/04 |
| | | | | 60/796 |
| 2016/0102570 | A1* | 4/2016 | Wilson | F01D 11/02 |
| | | | | 277/411 |
| 2016/0108750 | A1* | 4/2016 | Wilson | F01D 11/00 |
| | | | | 277/411 |
| 2016/0115805 | A1* | 4/2016 | Gibson | F01D 11/025 |
| | | | | 415/173.5 |
| 2016/0130963 | A1* | 5/2016 | Wilson | F01D 11/001 |
| | | | | 60/805 |
| 2018/0058240 | A1* | 3/2018 | Chuong | F01D 11/025 |

FOREIGN PATENT DOCUMENTS

| | | |
|---|---|---|
| CA | 2675597 | 5/2015 |
| EP | 2279364 | 2/2011 |
| EP | 2286119 | 2/2011 |
| EP | 2665897 | 11/2013 |
| EP | 2137383 | 12/2013 |
| WO | 2014150825 | 9/2014 |

* cited by examiner

SHAPED SPRING ELEMENT FOR A NON-CONTACT SEAL DEVICE

This invention was made with government support under Contract No. FA8650-09-D-2923-AETD awarded by the United States Air Force. The government may have certain rights in the invention.

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a seal element such as a knife edge seal that is positioned relative to a seal land. However, such seal assemblies may be susceptible to leakage between the seal element and the seal land as a result of asymmetric deflection between the associated rotor and stator. While non-contact seals have been developed in an effort to accommodate such asymmetric deflection, there is still room for improvement to provide an improved non-contact seal.

SUMMARY OF THE DISCLOSURE

According to an aspect of the present disclosure, a non-contact seal assembly is provided that includes a plurality of seal shoes, a seal base and a plurality of spring elements. The seal shoes are arranged about an axis in an annular array. The seal base circumscribes the annular array of the seal shoes. A first of the spring elements is radially between a first of the seal shoes and the seal base. The first of the spring elements includes a first mount, a second mount and a spring beam. The first mount is connected to the first of the seal shoes. The second mount is connected to the seal base. The spring beam extends a length longitudinally along a centerline from the first mount to the second mount. The spring beam includes opposing first and second surfaces. The first surface is disposed a first distance from the centerline. The second surface is disposed a second distance from the centerline. The first distance and the second distance change as the spring beam extends longitudinally along the centerline to provide at least a portion of the spring beam with a tapered geometry. The portion of the spring beam has a longitudinal length that is at least about five percent of the length of the spring beam.

According to another aspect of the present disclosure, another non-contact seal assembly is provided that includes a plurality of seal shoes, a seal base and a plurality of spring elements. The seal shoes are arranged about an axis in an annular array. The seal base circumscribes the annular array of the seal shoes. A first of the spring elements is radially between a first of the seal shoes and the seal base. The first of the spring elements includes a first mount, a second mount and a spring beam. The first mount is connected to the first of the seal shoes. The second mount is connected to the seal base. The spring beam extends a length longitudinally along a centerline from the first mount to the second mount. The spring beam includes first and second surfaces. The first surface is disposed a first distance from the centerline. The second surface is disposed a second distance from the centerline and opposite the first surface. The first distance and the second distance change as the spring beam extends longitudinally along the centerline to provide at least a portion of the spring beam with a tapered geometry. The first surface and/or the second surface is convex at least along a part of the portion of the spring beam.

According to still another aspect of the present disclosure, another non-contact seal assembly is provided that includes a plurality of seal shoes, a seal base and a plurality of spring elements. The seal shoes are arranged about an axis in an annular array. The seal base circumscribes the annular array of the seal shoes. A first of the spring elements is radially between a first of the seal shoes and the seal base. The first of the spring elements includes a first mount, a second mount and a spring beam. The first mount is connected to the first of the seal shoes. The second mount is connected to the seal base. The spring beam has a length and a centerline. The length of the spring beam extends longitudinally along the centerline from the first mount to the second mount. The spring beam includes opposing first and second surfaces. In a first portion of the spring beam, the first surface and the second surface substantially symmetrically converge towards the centerline as the first portion of the spring beam extends longitudinally along the centerline. The first portion of the spring beam has a longitudinal length that is equal to or greater than about fifteen percent of the length of the spring beam.

The portion of the spring beam may have a longitudinal length that is at least about five percent of the length of the spring beam.

The portion of the spring beam may have a longitudinal length that is between about five percent and about ten percent of the length of the spring beam.

The portion of the spring beam may have a longitudinal length that is between about ten percent and about twenty-five percent of the length of the spring beam.

The portion of the spring beam may have a longitudinal length that is greater than about twenty-five percent of the length of the spring beam.

A fillet may be included longitudinally between the portion of the spring beam and a respective one of the first and the second mounts.

The first surface may be convex at least along a part of the portion of the spring beam. In addition or alternatively, the second surface may be convex at least along a part of the portion of the spring beam.

The first distance and the second distance may change, along at least a part of the portion of the spring beam, as a function of a square root of a longitudinal distance from a longitudinal mid-point of the spring beam.

The portion of the spring beam may be a first portion of the spring beam disposed longitudinally next to the first mount. The first distance and the second distance may further change as the spring beam extends longitudinally along the centerline to provide a second portion of the spring beam, disposed longitudinally next to the second mount, with a tapered geometry. The second portion of the spring beam may have a longitudinal length that is at least about five percent of the length of the spring beam.

The longitudinal length of the first portion of the spring beam may be substantially equal to the longitudinal length of the second portion of the spring beam.

An intermediate portion of the spring beam may extend longitudinally between the first portion and the second portion of the spring beam. The first distance and/or the second distance may be substantially constant along the intermediate portion.

The intermediate portion of the spring beam may have a longitudinal length that is between about five percent and about ten percent of the length of the spring beam.

The intermediate portion of the spring beam may have a longitudinal length that is between about ten percent and about twenty-five percent of the length of the spring beam.

The intermediate portion of the spring beam may have a longitudinal length that is between about twenty-five percent and about fifty percent of the length of the spring beam.

The spring beam may extend radially relative to the axis between the first and the second surface. The tapered geometry may be or include a radial tapered geometry.

The spring beam may extend axially relative to the axis between the first and the second surfaces. The tapered geometry may be or include an axial tapered geometry.

The first of the spring elements may include a second spring beam extending a length longitudinally along a second centerline from the first mount to the second mount. The second spring beam may include opposing third and fourth surfaces. The third surface may be disposed a third distance from the second centerline. The fourth surface may be disposed a fourth distance from the second centerline. The third and the fourth distances may change as the second spring beam extends longitudinally along the second centerline to provide at least a portion of the second spring beam with a tapered geometry. The portion of the second spring beam may have a longitudinal length that is at least about five percent of the length of the second spring beam.

A ring structure may be included and axially engaged with the seal base. A secondary seal device may be included and mounted with the ring structure and configured to substantially seal an annular gap between the ring structure and the annular array of the seal shoes.

The foregoing features and the operation of the invention will become more apparent in light of the following description and the accompanying drawings.

DETAILED DESCRIPTION OF THE INVENTION

Figure 1:
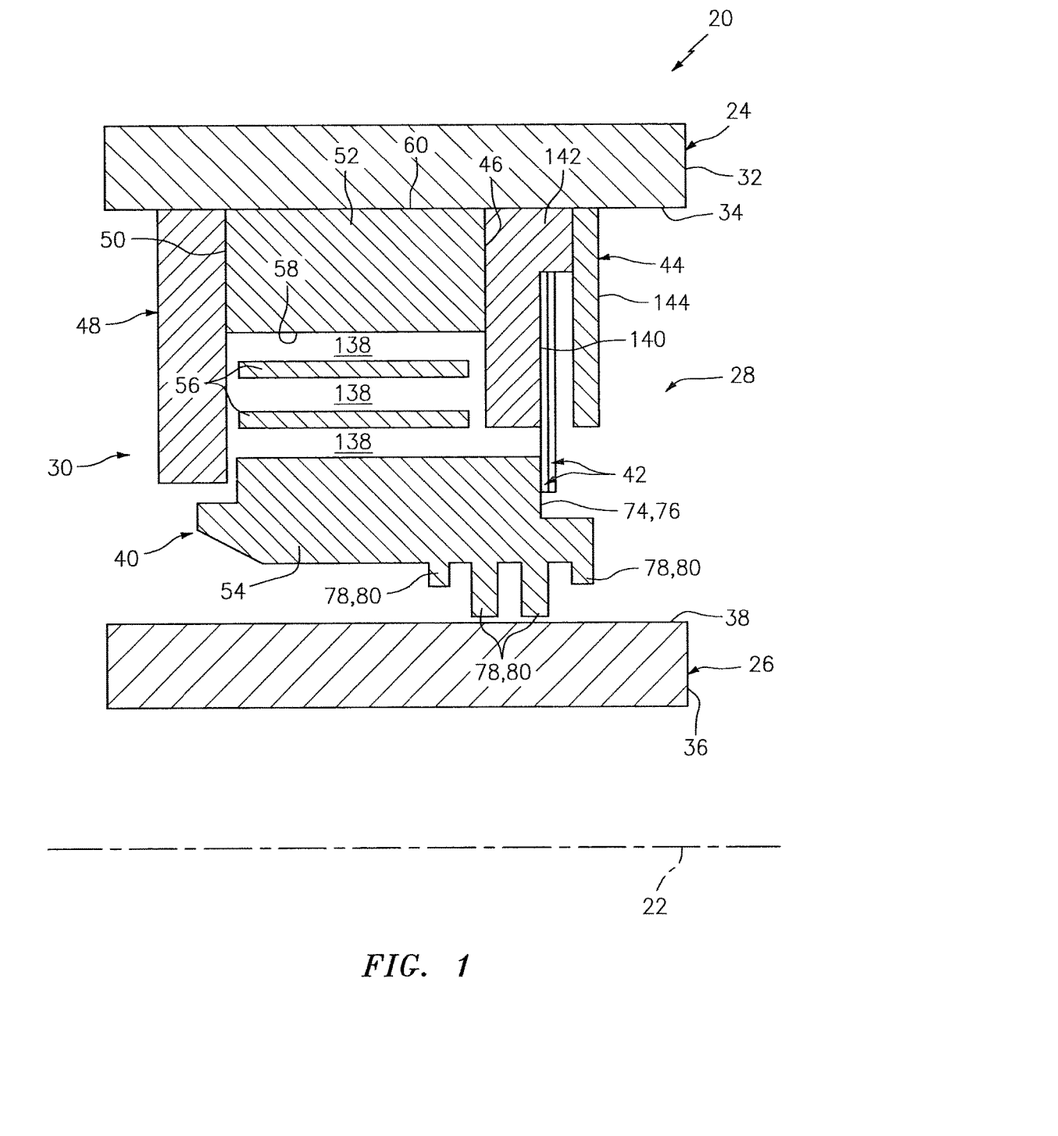
FIG. 1 is a top half, side section illustration of an assembly for an item of rotational equipment with a rotational axis.

FIG. 1 illustrates an assembly 20 for an item of rotational equipment with a rotational axis 22. An example of such an item of rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stator structure and a rotor structure.

The assembly 20 of FIG. 1 includes a stator structure 24, a rotor structure 26 and a seal assembly 28, which is fixed relative to the stator structure 24. This seal assembly 28 is mounted with the stator structure 24, and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical, and extends circumferentially around and faces towards the rotational axis 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34. The seal assembly 28, of course, may also or alternatively be fixedly attached to the seal carrier 32 using one or more other techniques/devices.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the rotational axis 22. The seal land surface 38 is disposed to face towards and is axially aligned with the seal carrier surface 34. While FIG. 1 illustrates the surfaces 34 and 38 with approximately equal axial lengths along the rotational axis 22, the seal land surface 38 may alternatively be longer or shorter than the seal carrier surface 34 in other embodiments.

The seal assembly 28 includes a primary seal device 40 and one or more secondary seal devices 42; e.g., 1, 2, 3 or more secondary seal devices 42. The seal assembly 28 also includes one or more additional components for positioning, supporting and/or mounting one or more of the seal devices with the stator structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a second end surface 46 of the primary seal device 40 relative to the stator structure 24. The seal assembly 28 of FIG. 1 also includes a second ring structure 48 (e.g., a scalloped support ring) configured for axially positioning and/or supporting a first end surface 50 of the primary seal device 40 relative to the stator structure 24. However, the second ring structure 48 may be omitted where, for example, the first end surface 50 of the primary seal device 40 may be abutted against another component/portion of the stator structure 24 (e.g., an annular or castellated shoulder) or otherwise axially positioned/secured with the stator structure 24.

Figure 2:
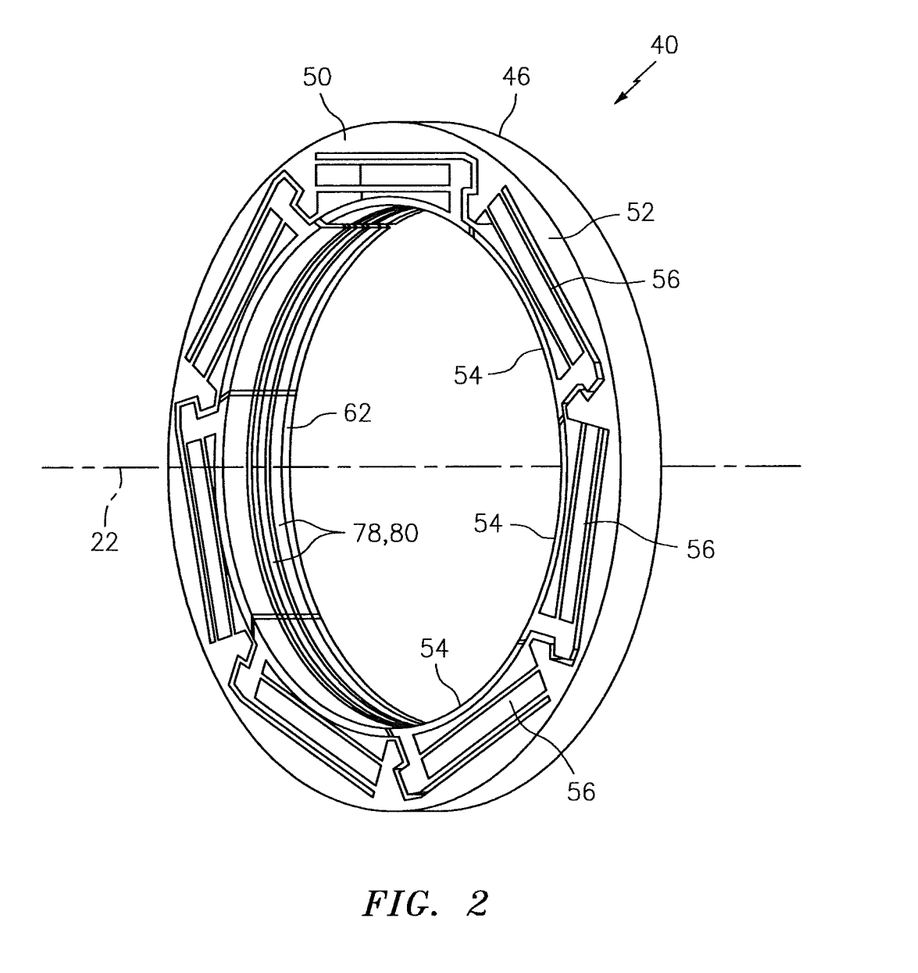
FIG. 2 is a perspective general representation of a primary seal device.

Referring to FIG. 2, the primary seal device 40 is configured as an annular non-contact seal device and, more particularly, a hydrostatic non-contact seal device. An example of such a hydrostatic non-contact seal device is a HALO™ type seal; however, the primary seal device 40 of the present disclosure is not limited to the foregoing exemplary hydrostatic non-contact seal device.

Figure 3:
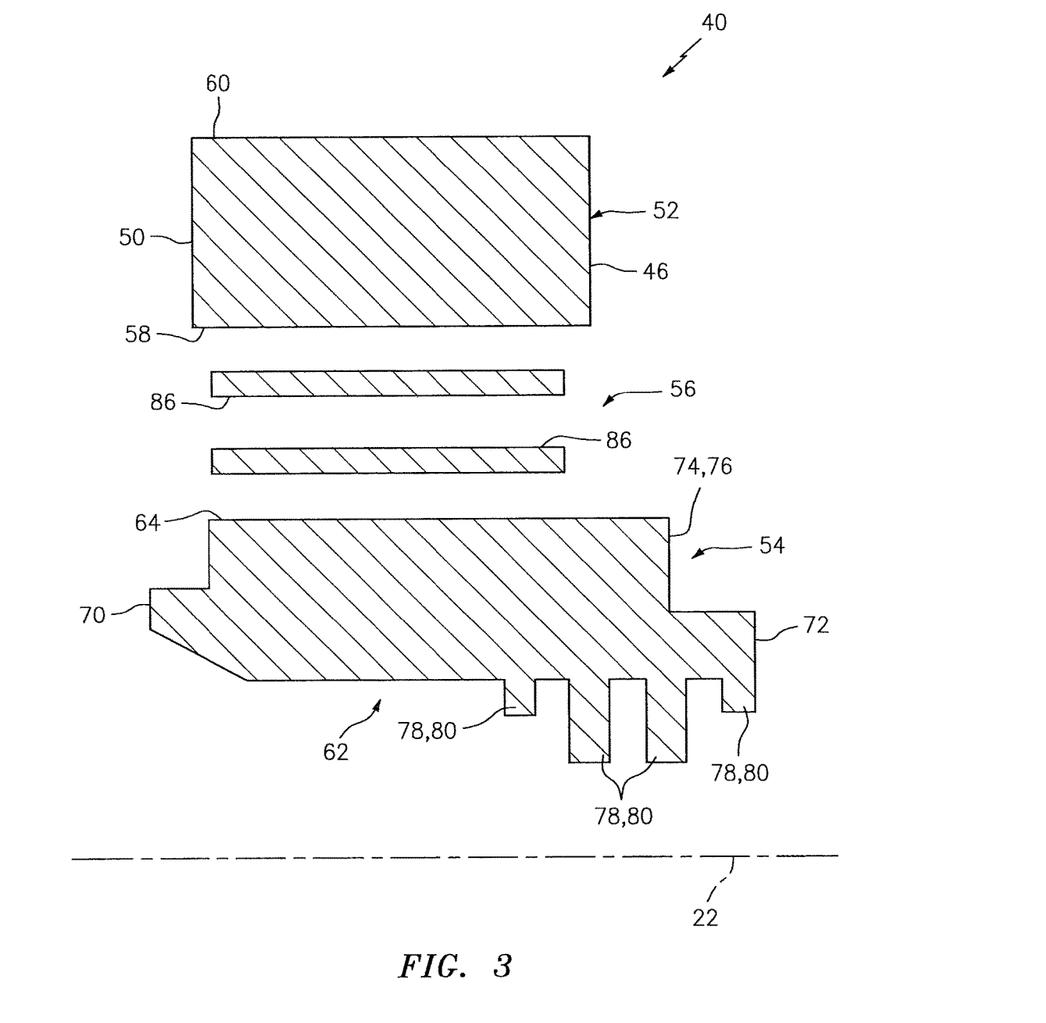
FIG. 3 is a top half, side sectional illustration of a primary seal device.
Figure 4:
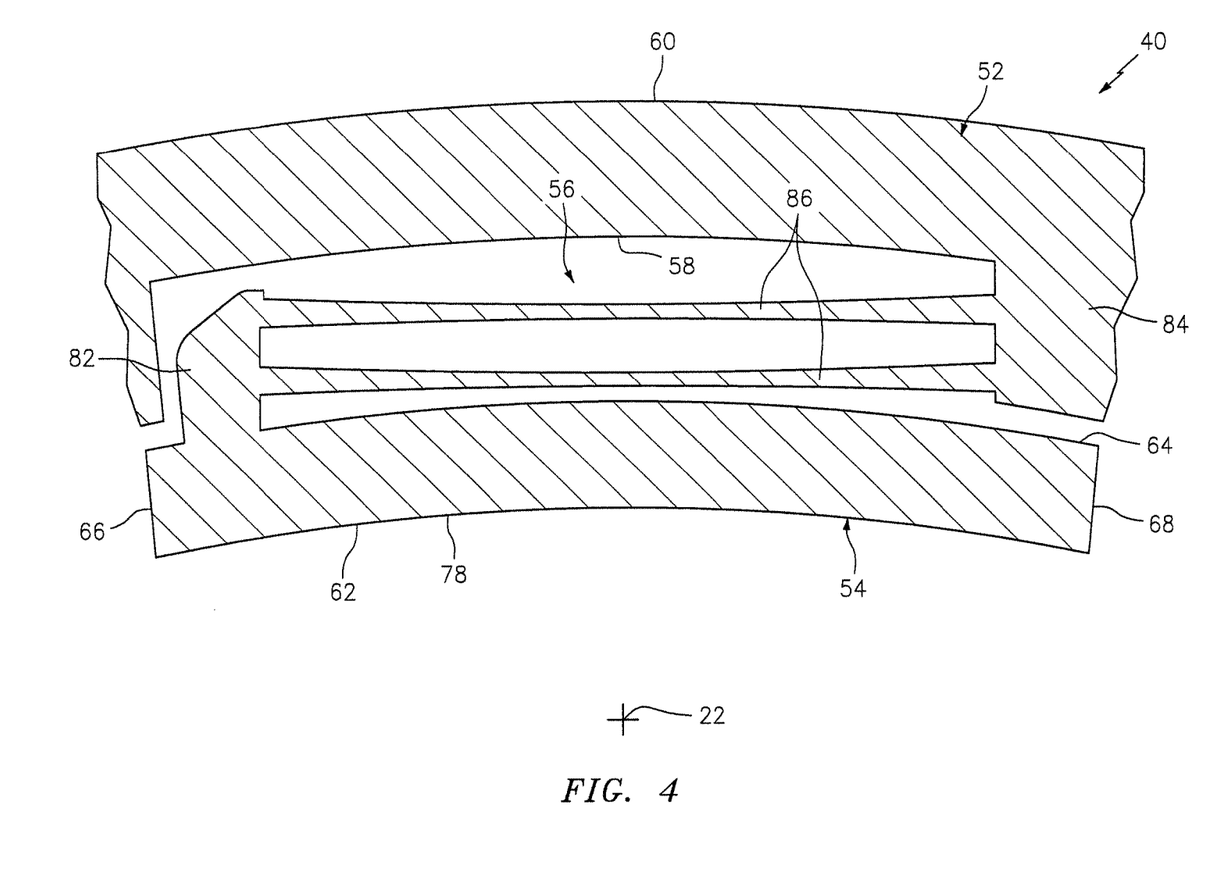
FIG. 4 is a partial, cross sectional illustration of the primary seal device of FIG. 3.

Referring to FIGS. 3 and 4, the primary seal device 40 includes a seal base 52, a plurality of seal shoes 54 and a plurality of spring elements 56. The seal base 52 is configured as an annular full hoop body, which extends circumferentially around the rotational axis 22. The seal base 52 is configured to circumscribe the seal shoes 54 as well as the spring elements 56. The seal base 52 extends axially along the rotational axis 22 between and foniis the second end surface 46 and the first end surface 50. The seal base 52 extends radially between an inner radial base side 58 and an outer radial base side 60, which radially engages (e.g., is press fit against) the stator structure 24 and, more particularly, the seal carrier surface 34 (see FIG. 1).

Referring to FIG. 2, the seal shoes 54 are configured as arcuate bodies arranged circumferentially about the rotational axis 22 in an annular array. This annular array of the seal shoes 54 extends circumferentially around the rotational axis 22, thereby forming an inner bore at an inner radial side 62 of the primary seal device 40. As best seen in FIG. 1, the inner bore is sized to receive the seal land 36, where the rotor structure 26 projects axially through (or into) the inner bore formed by the seal shoes 54.

Referring to FIG. 4, each of the seal shoes 54 extends radially from the inner radial side 62 of the primary seal device 40 to an outer radial surface 64 of that seal shoe 54. Each of the seal shoes 54 extends circumferentially around the rotational axis 22 between opposing first and second circumferential sides 66 and 68 of that seal shoe 54.

Referring to FIG. 3, each of the seal shoes 54 extends axially along the rotational axis 22 between a first shoe end 70 and a second shoe end 72. The first shoe end 70 may be axially offset from and project axially away from the first end surface 50. The second shoe end 72 may be axially offset from and project axially away from the second end surface 46. The seal shoes 54 of the present disclosure, however, are not limited to such exemplary relationships.

Referring to FIG. 3, each of the seal shoes 54 includes an arcuate end surface 74 generally at (e.g., on, adjacent or proximate) the second shoe end 72. In the array (see FIG. 2), these arcuate end surfaces 74 collectively form a generally annular (but circumferentially segmented) end surface 76 configured for sealingly engaging with the secondary seal devices 42; see FIG. 1. The seal shoes 54 of the present disclosure, however, are not limited to the foregoing exemplary configuration.

Referring to FIGS. 3 and 4, each of the seal shoes 54 includes one or more arcuate protrusions 78, which collectively form one or more (e.g., a plurality of axially spaced) generally annular (e.g., circumferentially segmented) ribs 80 at the inner radial side 62. Distal inner radial ends of one or more of these ribs 80 are configured to be arranged in close proximity with (but not touch) and thereby sealingly engage the seal land surface 38 in a non-contact manner (see FIG. 1), where the rotor structure 26 project axially through (or into) the inner bore formed by the seal shoes 54. The ribs 80 therefore are configured, generally speaking, as non-contact knife edge seal elements.

Referring to FIG. 2, the spring elements 56 are arranged circumferentially about the rotational axis 22 in an annular array. Referring again to FIGS. 3 and 4, the spring elements 56 are also arranged radially between the seal shoes 54 and the seal base 52. Each of the spring elements 56 is configured to connect a respective one of the seal shoes 54 with the seal base 52.

The spring element 56 shown in FIG. 4 includes first and second mounts 82 and 84 (e.g., generally radial fingers/projections) and one or more spring beams 86 (e.g., cantilever-leaf springs). The first mount 82 is connected to a respective one of the seal shoes 54 at (e.g., on, adjacent or proximate) the first circumferential side 66, where the opposing second circumferential side 68 of that seal shoe 54 is free floating. The second mount 84 is connected to the seal base 52, and is generally circumferentially aligned with or near the second circumferential side 68.

The spring beams 86 are radially stacked and spaced apart with one another. Each of these spring beams 86 extends laterally (e.g., tangentially or circumferentially relative to the rotational axis 22) between and is connected to the first mount 82 and the second mount 84. These the spring beams 86 may thereby laterally overlap a major circumferential portion (e.g., ~65-95%) of the respective seal shoe 54. The spring beams 86 of the present disclosure, however, are not limited to the foregoing exemplary configuration or values.

Figure 5:
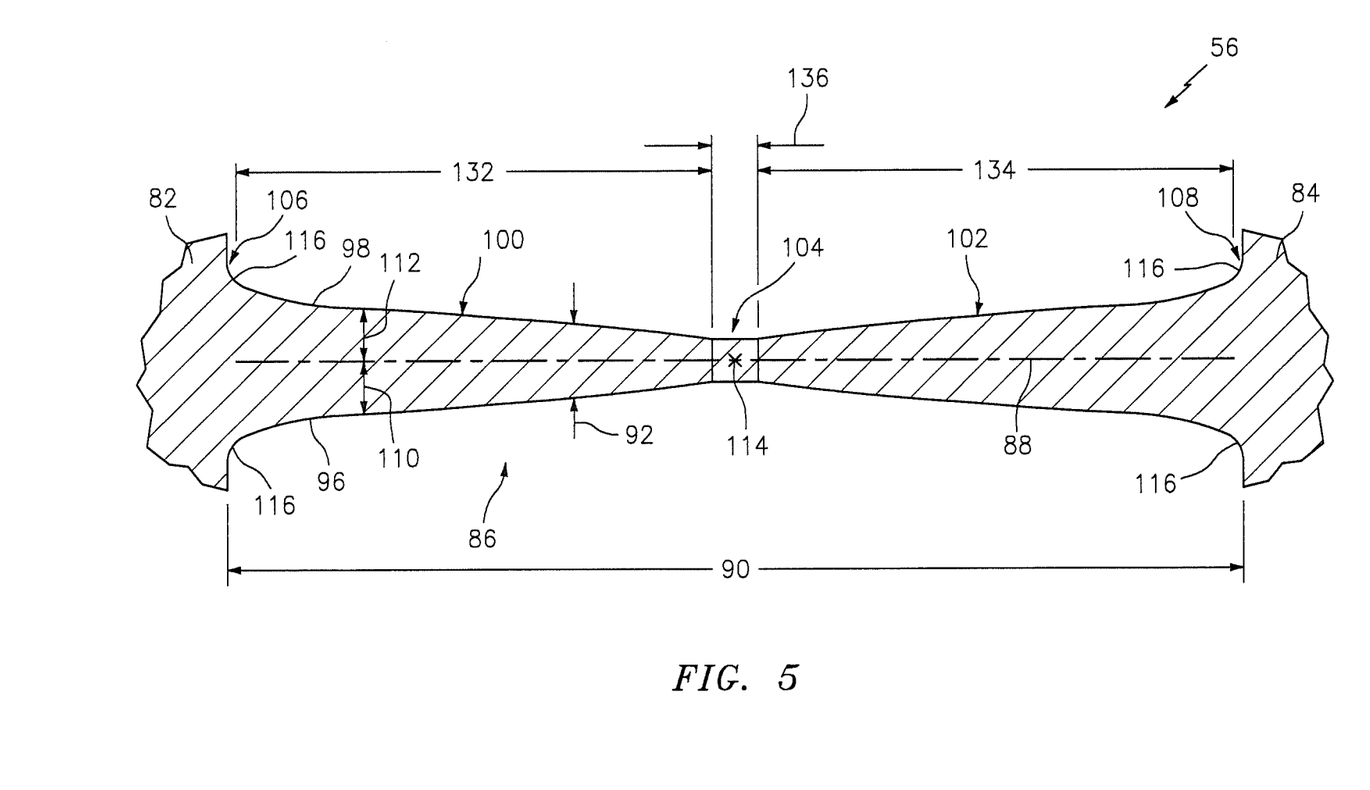
FIG. 5 is a cross-sectional illustration of a portion of a primary seal device, which portion includes a spring beam between two mounts.
Figure 6:
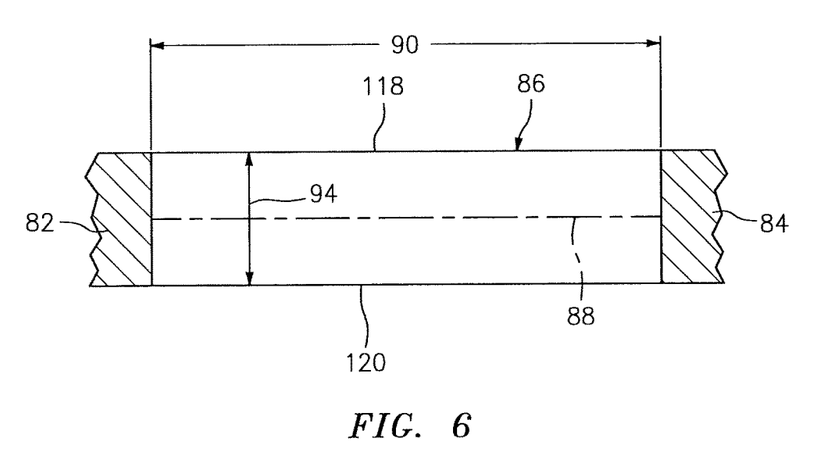
FIG. 6 is a circumferential sectional (e.g., top view) illustration depicting an embodiment of the spring beam of FIG. 5.
Figure 7:
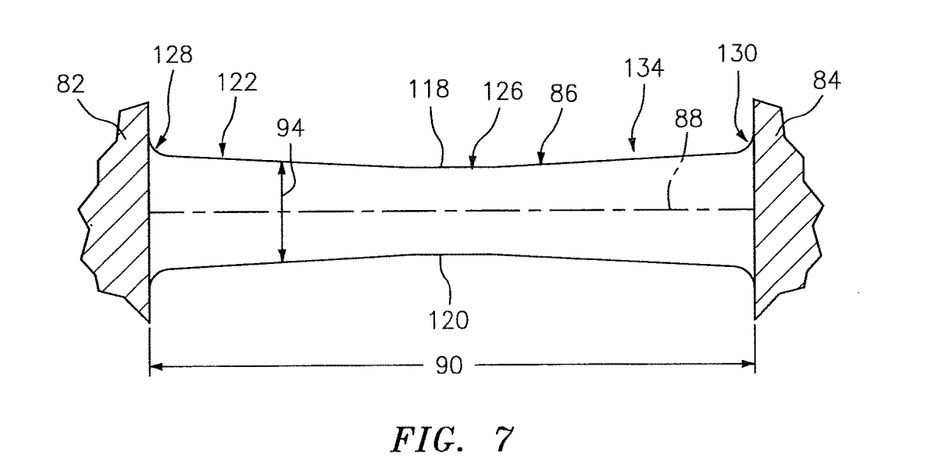
FIG. 7 is a circumferential sectional (e.g., top view) illustration depicting another embodiment of the spring beam of FIG. 5.

Referring now to FIG. 5, each of the spring beams 86 has a longitudinal centerline 88, a length 90, a thickness 92 and a width 94 (see FIGS. 6 and 7). The length 90 of the spring beam 86 extends longitudinally along the centerline 88 from the first mount 82 to the second mount 84.

The thickness 92 of the spring beam 86 extends radially between opposing radial side surfaces 96 and 98 of the spring beam 86. This thickness 92 may be selectively varied/changed to provide at least a portion of the spring beam 86 with a radially tapered geometry. The thickness 92 of the spring beam 86 of FIG. 5, for example, is selectively varied/changed to provide the spring beam 86 with opposing radially tapered end portions 100 and 102 and an intermediate portion 104. The spring beam 86 of FIG. 5 also includes opposing fillet portions 106 and 108.

The radially tapered geometry of each of the end portions 100 and 102 is defined by a first distance 110 and a second distance 112. The first distance 110 is a radial distance that extends in a first radial direction from the centerline 88 to the first radial side surface 96. The second distance 112 is a radial distance that extends in a second radial direction opposite the first radial direction from the centerline 88 to the second radial side surface 98.

Figure 8:
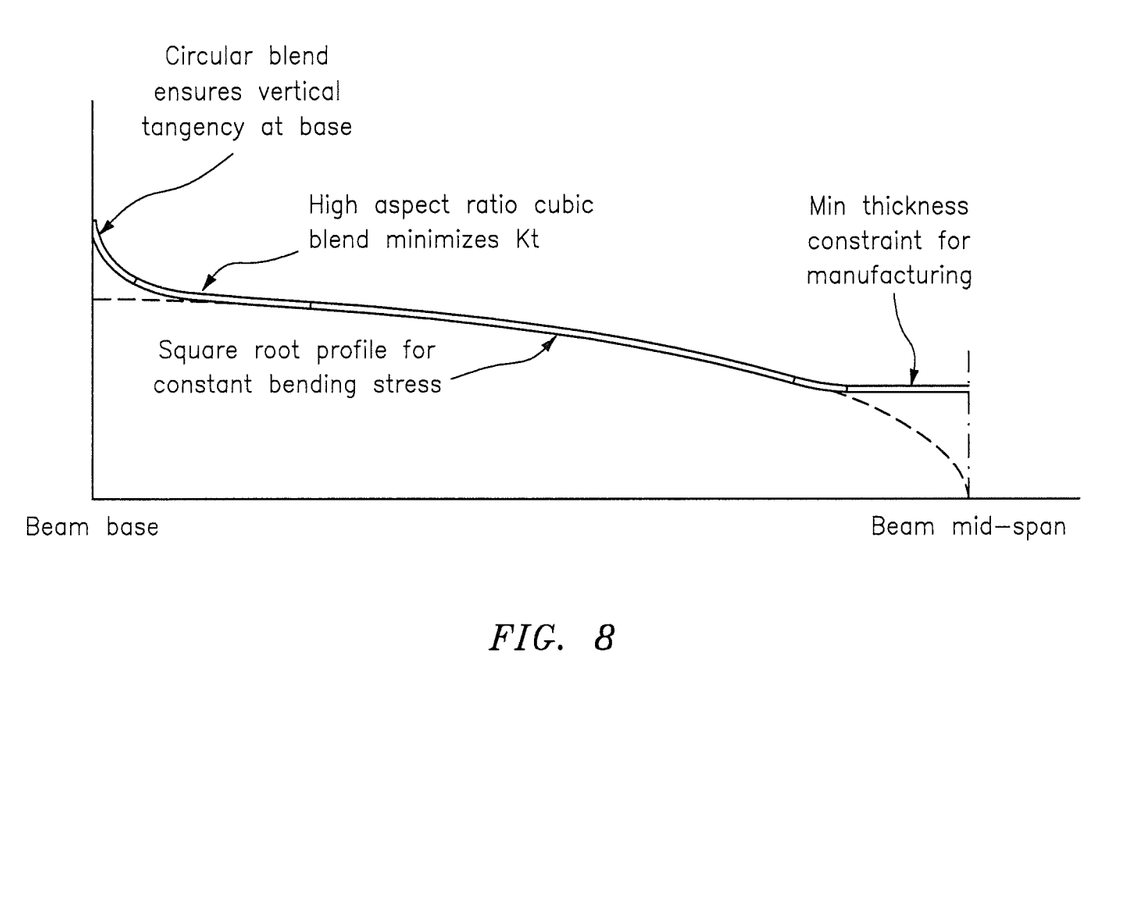
FIG. 8 is a graphical representation depicting how a portion of a spring beam may be tapered.

The first and second distances 110 and 112 may be symmetrically decreased as the respective end portion 100, 102 extends along the centerline 88 towards the intermediate portion 104 such that the surfaces 96 and 98 are substantially mirror images of one another along that end portion 100, 102. For example, the first and the second distances 110 and 112 may decrease according to the same function for at least a part of the end portions 100, 102; e.g., each distance equals or is related to (e.g., half of) a square root of a longitudinal distance from a longitudinal mid-point 114 of the spring beam 86 (see graphical representation of FIG. 8). The first and the second radial side surfaces 96 and 98 therefore substantially symmetrically converge toward one another and the centerline 88 as the respective end portion 100, 102 extends along the centerline 88 towards the intermediate portion 104 and the other end portion 102, 100. In this manner, a body of the spring beam 86 (including the fillets 116) may be symmetrical about the centerline 88 and an associated mid plane of the spring beam 86. It is also worth noting, at least part (or all) of the first and the second surfaces 96 and 98 along the end portions 100 and 102 shown in FIG. 5 are convex. In contrast, fillets 116 between the surfaces 96, 98 and the mounts 82, 94 are concave. Of course, at least some of the first and/or the second surfaces 96 and 98 along the end portions 100 and 102 and/or other portions may also be concave.

In contrast to the end portions 100 and 102, the thickness 92 of the spring beam 86 in the intermediate portion 104 may be substantially constant. The first and the second distances 110 and 112, in particular, may be substantially constant as the intermediate portion 104 extends along the centerline 88 between the end portions 100 and 102. Of course, in other embodiments, the first distance 110 or the second distance 112 may be varied in order to provide shape (e.g., curvature) to the first surface or the second surface.

Referring to FIG. 6, the width 94 of the spring beam 86 extends axially between opposing axial side surfaces 118 and 120 of the spring beam 86 (see also FIG. 3). In this embodiment, the width 94 is substantially constant across the entire length 90 of the spring beam 86. However, in other embodiments as shown in FIG. 7, the width 94 of the spring beam 86 may be varied/change in a similar manner as described herein with respect to the thickness 92 of the spring beam 86, or in a different manner The spring beam 86 of FIG. 7, for example, includes opposing axially tapered end portions 122 and 124 and an un-tapered intermediate portion 126. The spring beam 86 may also or alternatively include one or more fillet portions 128 and 130, which provide one or more fillets between the spring beam 86 and one or more of the mounts 82 and 84. Furthermore, while the width 94 is described above with respect to FIG. 7 as being tapered in addition to the tapered thickness 92, in other embodiments the width 94 may be tapered and the thickness 92 may be substantially constant.

Referring again to FIG. 5, the first end portion 100 is disposed next to the first mount 82. This first end portion 100 has a longitudinal length 132, which extends along the centerline 88 from the first fillet portion 106 to the intermediate portion 104. The longitudinal length 132 is at least about five percent (5%) of the length 90 of the spring beam 86. In the specific embodiment of FIG. 5, the longitudinal length 132 is greater than about twenty-five percent (25%) of the length 90 of the spring beam 86; e.g., about 35-45% of the length 90. However, in other embodiments, the longitudinal length 132 may be between about ten percent (10%) and about twenty-five percent (25%) of the length 90 of the spring beam 86. In still other embodiments, the longitudinal length 132 may be between about five percent (5%) and about ten percent (10%) of the length 90 of the spring beam 86. Of course, the present disclosure is not limited to the foregoing exemplary dimensions.

The second end portion 102 is disposed next to the second mount 84. This second end portion 102 has a longitudinal length 134, which extends along the centerline 88 from the second fillet portion 108 to the intermediate portion 104. The longitudinal length 134 may be substantially equal to (or different than) the longitudinal length 132. The longitudinal length 134 is at least about five percent (5%) of the length 90 of the spring beam 86. In the specific embodiment of FIG. 5, the longitudinal length 134 is greater than about twenty-five percent (25%) of the length 90 of the spring beam 86; e.g., about 35-45% of the length 90. However, in other embodiments, the longitudinal length 134 may be between about ten percent (10%) and about twenty-five percent (25%) of the length 90 of the spring beam 86. In still other embodiments, the longitudinal length 134 may be between about five percent (5%) and about ten percent (10%) of the length 90 of the spring beam 86. Of course, the present disclosure is not limited to the foregoing exemplary dimensions.

The intermediate portion 104 is disposed between the first end portion 100 and the second end portion 102. This intermediate portion 104 has a longitudinal length 136, which extends along the centerline 88 between the first end portion 100 and the second end portion 102. The longitudinal length 136 may be different than (or substantially equal to) the longitudinal lengths 132 and/or 134. The longitudinal length 136 of FIG. 5, for example, is between about five percent (5%) and about ten percent (10%) of the length 90 of the spring beam 86. However, in other embodiments, the longitudinal length 136 may be between about ten percent (10%) and about twenty-five percent (25%) of the length 90 of the spring beam 86. In still other embodiments, the longitudinal length 136 may be between about twenty-five percent (25%) and about fifty percent (50%) of the length 90 of the spring beam 86. Of course, the present disclosure is not limited to the foregoing exemplary dimensions. For example, the longitudinal length 136 may be larger than fifty percent of the length 90 of the spring beam 86.

The first fillet portion 106 is disposed between the first end portion 100 and the first mount 82. The first fillet portion 106 includes one or more fillets 116. The first fillet 116 is disposed longitudinally between the first surface 96 and the first mount 82. The second fillet 116 is disposed longitudinally between the second surface 98 and the first mount 82. Each of these fillets 116 may have a sectional geometry which provides or approximates curvature with G2 continuity at the tangency with the spring beam 86. Of course, in other embodiments, the first fillet portion 106 may be incorporated into the first end portion 100.

The second fillet portion 108 is disposed between the second end portion 102 and the second mount 84. The second fillet portion 108 includes one or more fillets 116. The first fillet 116 is disposed longitudinally between the first surface 96 and the second mount 84. The second fillet 116 is disposed longitudinally between the second surface 98 and the second mount 84. Each of these fillets 116 may have a sectional geometry which provides or approximates curvature with G2 continuity at the tangency with the spring beam 86. Of course, in other embodiments, the second fillet portion 108 may be incorporated into the second end portion 102.

Figure 9:
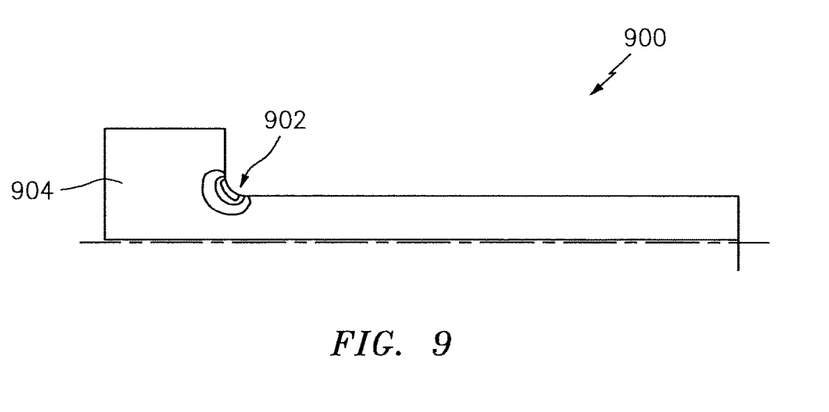
FIG. 9 is a partial stress diagram for a portion of another spring beam.
Figure 10:
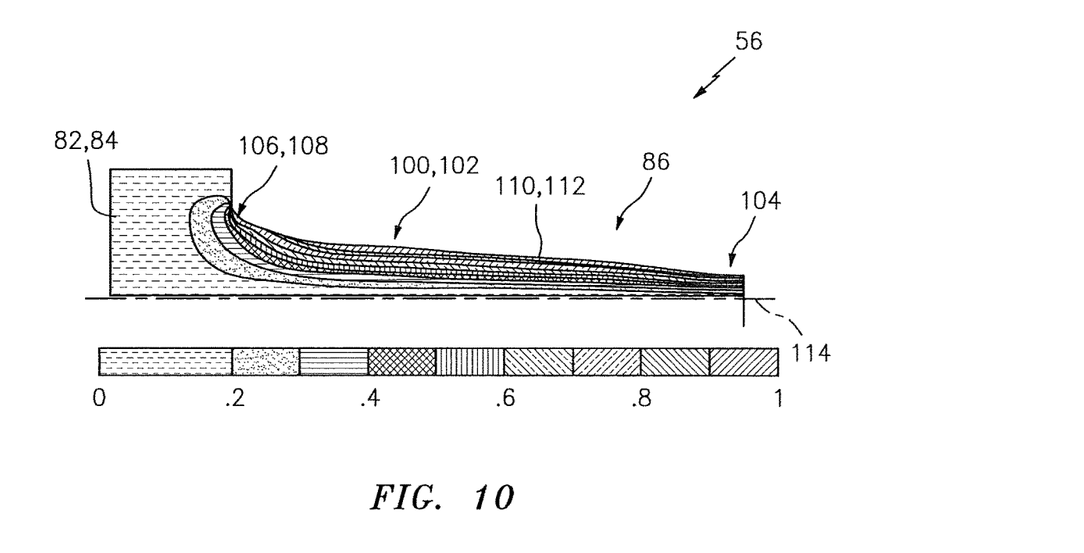
FIG. 10 is a partial stress diagram for a portion of a spring beam according to an embodiment of the present disclosure.

The above-referenced dimensions of the spring beam 86 may be selected in order to tailor a stress distribution within the spring beam 86. In particular, the first and the second distances 110 and 112 may be varied and the longitudinal lengths 132 and 134 may be selected in order to uniformly distribute, or more unifoimly distribute, stress along the spring beam 86. For example, FIG. 9 illustrates a left side of a top half portion of another spring beam 900 configured with a substantially constant thickness except for within its fillet portions 902, one of which is shown in FIG. 9. With such a configuration, the spring beam 900/mount 904 are subject to concentrated stress loads at the intersection between the spring beam 900 and the mount 904. In contrast, referring to FIG. 10, by tapering the end region 100, 102 as described above and extending the longitudinal length 132, 134 (see FIG. 5) of that end region 100, 102 a relatively large percentage of the length 90 of the spring beam 86, the stress load may be spread out more evenly along the spring beam 86. In this manner, the tapered configuration of the spring beam 86 may reduce and/or more evenly distribute internal stresses compared to the embodiment of FIG. 9.

Referring to FIG. 1, during operation of the primary seal device 40, rotation of the rotor structure 26 may develop aerodynamic forces and apply a fluid pressure to the seal shoes 54 causing the each seal shoe 54 to respectively move radially relative to the seal land surface 38. The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to create a primary seal of the gap between the seal land surface 38 and ribs 80 within predetermined design tolerances.

While the primary seal device 40 is operable to generally seal the annular gap 30 between the stator structure 24 and the rotor structure 26 as described above, fluid (e.g., gas) may still flow axially through passages 138 defined by radial gaps between the components 54, 56 and 58. The secondary seal devices 42 therefore are provided to seal off these passages 138 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stator structure 24 adjacent the primary seal device 40. In this arrangement, the stack of the secondary seal devices 42 is operable to axially engage and form a seal between the end surface 76 of the array of the seal shoes 54 and an annular surface 140 of the first ring structure 44. These surfaces 76 and 140 are axially aligned with one another, which enables the stack of the secondary seal devices 42 to slide radially against, but maintain sealingly engagement with, the end surface 76 as the seal shoes 54 move radially relative to the seal land surface 38 as described above. Of course, in other embodiments, the surfaces 76 and 140 may be misaligned where the secondary seal device(s) 42 are correspondingly configured.

The first ring structure 44 may include a secondary seal device support ring 142 and a retention ring 144. The support ring 142 is configured with an annular full hoop body, which extends circumferentially around the rotational axis 22. The support ring 142 includes the annular surface 140, and is disposed axially adjacent and engaged with the seal base 52.

The retention ring 144 is configured with an annular full hoop body, which extends circumferentially around the rotational axis 22. The retention ring 144 is disposed axially adjacent and engaged with the support ring 142, thereby capturing the stack of the secondary seal devices 42 within an annular channel foimed between the rings 142 and 144. The stack of the secondary seal devices 42, of course, may also or alternatively be attached to one of the rings by, for example, a press fit connection and/or otherwise.

The present disclosure is not limited to the exemplary primary seal device 40 type or configuration described above. Various other non-contact seals are known in the art and may be reconfigured in light of the disclosure above to be included with the assembly 20 of the present disclosure. Other examples of non-contact seals are disclosed in U.S. Pat. No. 8,172,232; U.S. Pat. No. 8,002,285; U.S. Pat. No. 7,896,352; U.S. Pat. No. 7,410,173; U.S. Pat. No. 7,182,345; and U.S. Pat. No. 6,428,009, each of which is hereby incorporated herein by reference in its entirety.

Figure 11:
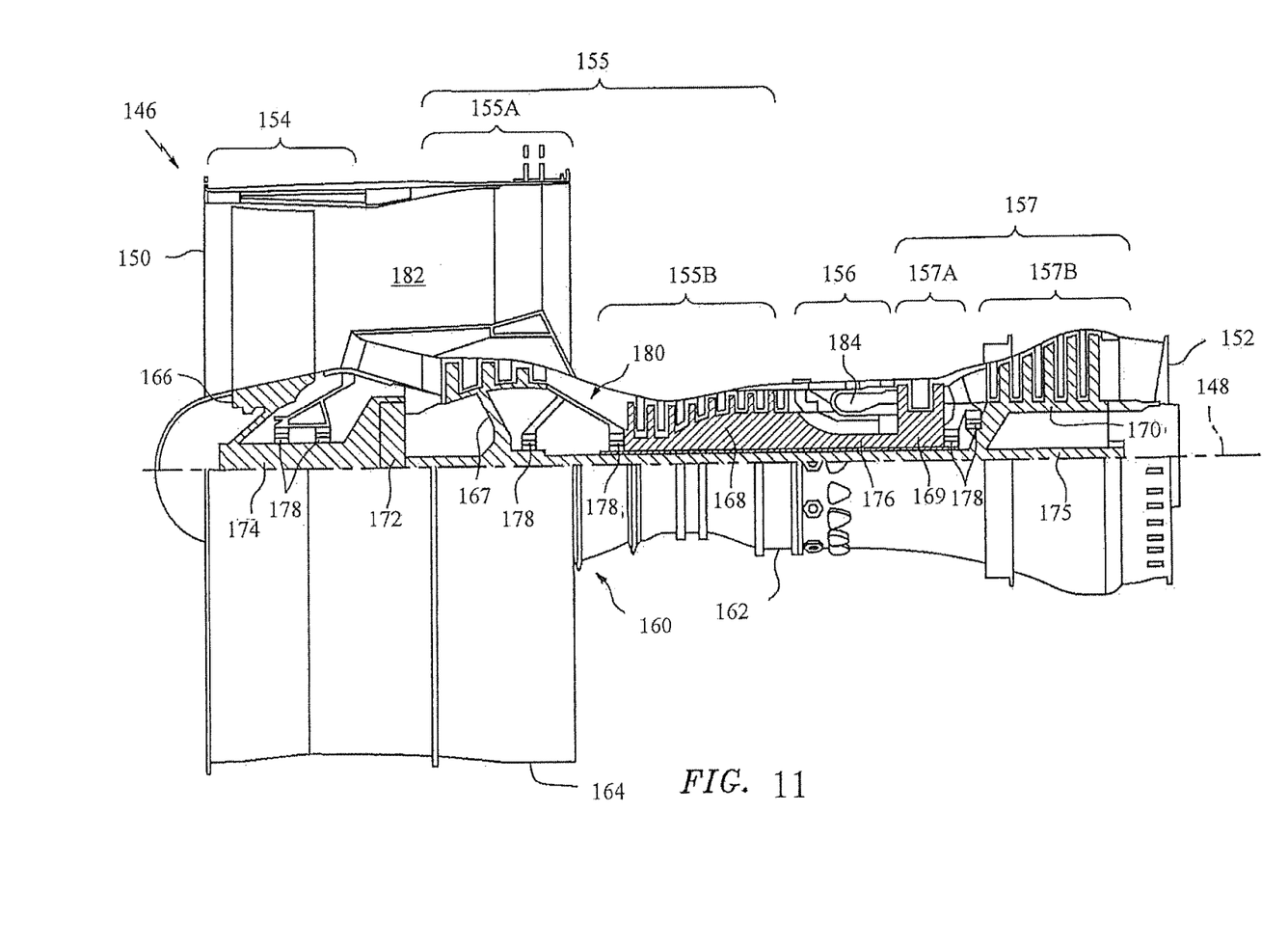
FIG. 11 is a side, cutaway illustration of a gas turbine engine which may include the assembly of FIG. 1.

As described above, the assembly 20 of the present disclosure may be configured with various different types and configurations of rotational equipment. FIG. 11 illustrates one such type and configuration of the rotational equipment—a geared turbofan gas turbine engine 146. Such a turbine engine 146 includes various stator structures (e.g., bearing supports, hubs, cases, etc.) as well as various rotor structures (e.g., rotor disks, shafts, etc.) as described below, where the stator structure 24 and the rotor structure 26 can respectively be configured as anyone of the foregoing structures in the turbine engine 146 of FIG. 11, or other structures not mentioned herein.

Referring still to FIG. 11, the turbine engine 146 extends along a rotational axis 148 (e.g., the rotational axis 22) between an upstream airflow inlet 150 and a downstream airflow exhaust 152. The turbine engine 146 includes a fan section 154, a compressor section 155, a combustor section 156 and a turbine section 157. The compressor section 155 includes a low pressure compressor (LPC) section 155A and a high pressure compressor (HPC) section 155B. The turbine section 157 includes a high pressure turbine (HPT) section 157A and a low pressure turbine (LPT) section 157B.

The engine sections 154-157B are arranged sequentially along the rotational axis 148 within an engine housing 160, a portion or component of which may include or be connected to the stator structure 24. This housing 160 includes an inner case 162 (e.g., a core case) and an outer case 164 (e.g., a fan case). The inner case 162 may house one or more of the engine sections 155-157; e.g., an engine core. The outer case 164 may house at least the fan section 154.

Each of the engine sections 154, 155A, 155B, 157A and 157B includes a respective rotor 166-170. Each of these rotors 166-170 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 166 is connected to a gear train 172, for example, through a fan shaft 174. The gear train 172 and the LPC rotor 167 are connected to and driven by the LPT rotor 170 through a low speed shaft 175. The HPC rotor 168 is connected to and driven by the HPT rotor 169 through a high speed shaft 176. The shafts 174-176 are rotatably supported by a plurality of bearings 178; e.g., rolling element and/or thrust bearings. Each of these bearings 178 is connected to the engine housing 160 by at least one stationary structure such as, for example, an annular support strut.

During operation, air enters the turbine engine 146 through the airflow inlet 150. This air is directed through the fan section 154 and into a core gas path 180 and a bypass gas path 182. The core gas path 180 flows sequentially through the engine sections 155-157. The bypass gas path 182 flows away from the fan section 154 through a bypass duct, which circumscribes and bypasses the engine core. The air within the core gas path 180 may be referred to as "core air". The air within the bypass gas path 182 may be referred to as "bypass air".

The core air is compressed by the compressor rotors 167 and 168 and directed into a combustion chamber 184 of a combustor in the combustor section 156. Fuel is injected into the combustion chamber 184 and mixed with the compressed core air to provide a fuel-air mixture. This fuel air mixture is ignited and combustion products thereof flow through and sequentially cause the turbine rotors 169 and 170 to rotate. The rotation of the turbine rotors 169 and 170 respectively drive rotation of the compressor rotors 168 and 167 and, thus, compression of the air received from a core airflow inlet. The rotation of the turbine rotor 170 also drives rotation of the fan rotor 166, which propels bypass air through and out of the bypass gas path 182. The propulsion of the bypass air may account for a majority of thrust generated by the turbine engine 146, e.g., more than seventy-five percent (75%) of engine thrust. The turbine engine 146 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 11), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A non-contact seal assembly, comprising:
a plurality of seal shoes arranged about an axis in an annular array;
a seal base circumscribing the annular array of the seal shoes; and
a plurality of spring elements, a first of the spring elements radially between a first of the seal shoes and the seal base, and the first of the spring elements including:
a first mount connected to the first of the seal shoes;
a second mount connected to the seal base; and
a spring beam extending a length longitudinally along a centerline from the first mount to the second mount, and the spring beam including opposing first and second surfaces;
wherein the first surface is disposed a first distance from the centerline, and the second surface is disposed a second distance from the centerline;
wherein the first distance and the second distance change as the spring beam extends longitudinally along the centerline to provide at least a portion of the spring beam with a tapered geometry; and
wherein the portion of the spring beam has a longitudinal length that is at least about five percent of the length of the spring beam.

2. The assembly of claim 1, wherein the portion of the spring beam has a longitudinal length that is between about five percent and about ten percent of the length of the spring beam.

3. The assembly of claim 1, wherein the portion of the spring beam has a longitudinal length that is between about ten percent and about twenty-five percent of the length of the spring beam.

4. The assembly of claim 1, wherein the portion of the spring beam has a longitudinal length that is greater than about twenty-five percent of the length of the spring beam.

5. The assembly of claim 1, further comprising a fillet longitudinally between the portion of the spring beam and a respective one of the first and the second mounts.

6. The assembly of claim 1, wherein at least one of:
the first surface is convex at least along a part of the portion of the spring beam; or
the second surface is convex at least along a part of the portion of the spring beam.

7. The assembly of claim 1, wherein the first distance and the second distance change, along at least a part of the portion of the spring beam, as a function of a square root of a longitudinal distance from a longitudinal mid-point of the spring beam.

8. The assembly of claim 1, wherein:
the portion of the spring beam is a first portion of the spring beam disposed longitudinally next to the first mount;
the first distance and the second distance further change as the spring beam extends longitudinally along the centerline to provide a second portion of the spring beam, disposed longitudinally next to the second mount, with a tapered geometry; and
wherein the second portion of the spring beam has a longitudinal length that is at least about five percent of the length of the spring beam.

9. The assembly of claim 8, wherein the longitudinal length of the first portion of the spring beam is substantially equal to the longitudinal length of the second portion of the spring beam.

10. The assembly of claim 8, wherein:
an intermediate portion of the spring beam extends longitudinally between the first portion and the second portion of the spring beam; and
at least one of the first distance or the second distance is substantially constant along the intermediate portion.

11. The assembly of claim 10, wherein the intermediate portion of the spring beam has a longitudinal length that is between about five percent and about ten percent of the length of the spring beam.

12. The assembly of claim 10, wherein the intermediate portion of the spring beam has a longitudinal length that is between about ten percent and about twenty-five percent of the length of the spring beam.

13. The assembly of claim 10, wherein the intermediate portion of the spring beam has a longitudinal length that is between about twenty-five percent and about fifty percent of the length of the spring beam.

14. The assembly of claim 1, wherein the spring beam extends radially relative to the axis between the first and the second surface, and the tapered geometry comprises a radial tapered geometry.

15. The assembly of claim 1, wherein the spring beam extends axially relative to the axis between the first and the second surfaces, and the tapered geometry comprises an axial tapered geometry.

16. The assembly of claim 1, wherein:
the first of the spring elements further includes a second spring beam extending a length longitudinally along a second centerline from the first mount to the second mount;
the second spring beam includes opposing third and fourth surfaces;
the third surface is disposed a third distance from the second centerline, and the fourth surface is disposed a fourth distance from the second centerline;
the third and the fourth distances change as the second spring beam extends longitudinally along the second centerline to provide at least a portion of the second spring beam with a tapered geometry; and
the portion of the second spring beam has a longitudinal length that is at least about five percent of the length of the second spring beam.

17. The assembly of claim 1, further comprising:
a ring structure axially engaged with the seal base; and
a secondary seal device mounted with the ring structure and configured to substantially seal an annular gap between the ring structure and the annular array of the seal shoes.

18. A non-contact seal assembly, comprising:
a plurality of seal shoes arranged about an axis in an annular array;
a seal base circumscribing the annular array of the seal shoes; and
a plurality of spring elements, a first of the spring elements radially between a first of the seal shoes and the seal base, and the first of the spring elements including:
a first mount connected to the first of the seal shoes;
a second mount connected to the seal base; and
a spring beam extending a length longitudinally along a centerline from the first mount to the second mount, and the spring beam including first and second surfaces;
wherein the first surface is disposed a first distance from the centerline, and the second surface is disposed a second distance from the centerline and opposite the first surface;
wherein the first distance and the second distance change as the spring beam extends longitudinally along the centerline to provide at least a portion of the spring beam with a tapered geometry; and
wherein the first surface and the second surface are convex at least along a part of the portion of the spring beam.

19. The assembly of claim 1, wherein the portion of the spring beam has a longitudinal length that is at least about five percent of the length of the spring beam.

20. A non-contact seal assembly, comprising:
a plurality of seal shoes arranged about an axis in an annular array;
a seal base circumscribing the annular array of the seal shoes; and
a plurality of spring elements, a first of the spring elements radially between a first of the seal shoes and the seal base, and the first of the spring elements including:
a first mount connected to the first of the seal shoes;
a second mount connected to the seal base; and
a spring beam having a length and a centerline, the length of the spring beam extending longitudinally along the centerline from the first mount to the second mount, and the spring beam including opposing first and second surfaces;
wherein, in a first portion of the spring beam, the first surface and the second surface substantially symmetrically converge towards the centerline as the first portion of the spring beam extends longitudinally along the centerline; and
wherein the first portion of the spring beam has a longitudinal length that is equal to or greater than about fifteen percent of the length of the spring beam.

* * * * *

UNITED STATES PATENT AND TRADEMARK OFFICE
CERTIFICATE OF CORRECTION

PATENT NO.         : 10,060,535 B2  
APPLICATION NO.    : 15/053696  
DATED              : August 28, 2018  
INVENTOR(S)        : Simpson et al.

Page 1 of 1

It is certified that error appears in the above-identified patent and that said Letters Patent is hereby corrected as shown below:

In the Specification

Column 1, Line 4, delete "government" and insert --Government--

Column 1, Line 5, delete "FA8650-09-D-2923-AETD" and insert --FA8650-09-D-2923--

Column 1, Line 6, delete "government" and insert --Government--

Column 5, Line 15, delete "foniis" and insert --forms--

Column 8, Line 52, delete "unifoimly" and insert --uniformly--

Signed and Sealed this  
Second Day of October, 2018

Andrei Iancu  
*Director of the United States Patent and Trademark Office*